United States Patent [19]

Eggert, Jr.

[11] Patent Number: 4,478,153

[45] Date of Patent: Oct. 23, 1984

[54] RESILIENT STEERING CONTROL ASSEMBLY

[76] Inventor: Walter S. Eggert, Jr., 26 Moredon Rd., Huntington Valley, Pa. 19006

[21] Appl. No.: 352,793

[22] Filed: Feb. 26, 1982

[51] Int. Cl.³ .............................. B61F 3/08; B61F 5/38; B61F 5/32
[52] U.S. Cl. ...................................... 105/168; 105/165; 105/182 R; 105/218 A; 105/224.1
[58] Field of Search ................... 105/165, 168, 182 R, 105/224 R, 224.1, 218 A

[56] References Cited

U.S. PATENT DOCUMENTS

| | | | |
|---|---|---|---|
| 4,003,316 | 1/1977 | Monselle | 105/224.1 X |
| 4,131,069 | 12/1978 | List | 105/224.1 X |
| 4,332,201 | 6/1982 | Pollard et al. | 105/224.1 X |
| 4,338,865 | 7/1982 | Eggert, Jr. | 105/224.1 X |
| 4,434,719 | 3/1984 | Mekosh, Jr. | 105/182 R |

*Primary Examiner*—Howard Beltran
*Attorney, Agent, or Firm*—Edward M. Farrell; Herman Foster; Thomas I. Davenport

[57] ABSTRACT

A coupling assembly is provided to control the movement between two structural bodies when different forces are applied thereto. Initially, a restraint and limited movement is permitted by an elastomeric member for relatively low differential forces. With high differential forces, the restraint is overcome and the structural bodies move with respect to each other on a low friction member.

8 Claims, 5 Drawing Figures

RESILIENT STEERING CONTROL ASSEMBLY

BACKGROUND OF THE INVENTION

In many railway car applications, it is necessary to provide some degrees of movement between the main car body and the truck supporting the body. For example, secondary suspension systems are employed to permit limited degrees of longitudinal, lateral and vertical relative movements between the car body and truck during operation. Such suspension systems often include, among other things, elastomeric members which provide restraints for stability while still permitting small movements between the bodies and absorbing some of the acceleration forces which tend to be transmitted from the truck to the car body.

In order to permit relative movements between the car body and truck, low friction slide members have been employed between the truck and car body to facilitate the movement when turns are being made by the car.

The coupling assembly of the subject invention was illustrated in a copending application entitled "An Articulated Truck Assembly", Ser. No. 306,156, filed Sept. 28, 1981, now U.S. Pat. No. 4,434,719 issued Mar. 6, 1984, and assigned to the same assignee as the present invention.

The invention in the copending application was illustrated as an element useful in a steerable truck. However, the coupling assembly per se has applications in other cases where two structural bodies are to be coupled to each other and adapted to be moved at different rates for different levels of applied differential forces. For example, the coupling assembly could replace the lateral bumper stop members found in most conventional railway cars wherein limited lateral movement between the car body and truck is permitted before the stop members prevent further relative movement therebetween.

OBJECTS OF THE INVENTION

It is an object of this invention to provide an improved coupling assembly that provides controlled spring rates between two structural bodies in all directions and freedom to move in a single direction when predetermined differential forces are applied thereto in the direction involved.

It is a further object of this invention to provide an improved coupling assembly between two structural bodies which permit the bodies to be readily moved a predetermined distance with respect to each other in a predetermined direction when relatively low differential forces are applied thereto with an elastomeric restraint being provided after the bodies have moved the predetermined distance.

BRIEF SUMMARY OF THE INVENTION

In accordance with the present invention, a coupling assembly is provided between a pair of vertically disposed structural bodies to permit relative movement therebetween when the relative forces applied to the bodies exceed a predetermined level. The coupling assembly is fixedly mounted to the first body and movably mounted to the second body. Low friction means are disposed between one of the bodies and the coupling assembly. The coupling assembly includes an outer metal cap member, an inner metal member disposed within and spaced from the outer cap member, and an elastomeric member disposed between the inner and outer metal members. The inner metal member includes a recess therein for receiving a protruding element connected to the structural body associated with the low friction means. The protruding element loosely fits into the recess of the inner metal member to permit movement therein in a predetermined direction. High relative forces between said first and second bodies cause the two bodies to move with respect to each other on the low friction means. Prior to movement, the elastomeric members provides restraint and absorbs the applied forces up to a predetermined level at which time the sliding action results. The arrangement may also permit relative movement of the bodies on the low friction means with small applied forces and then provide elastomeric restraints.

DETAILED DESCRIPTION OF THE INVENTION

Figure 1:
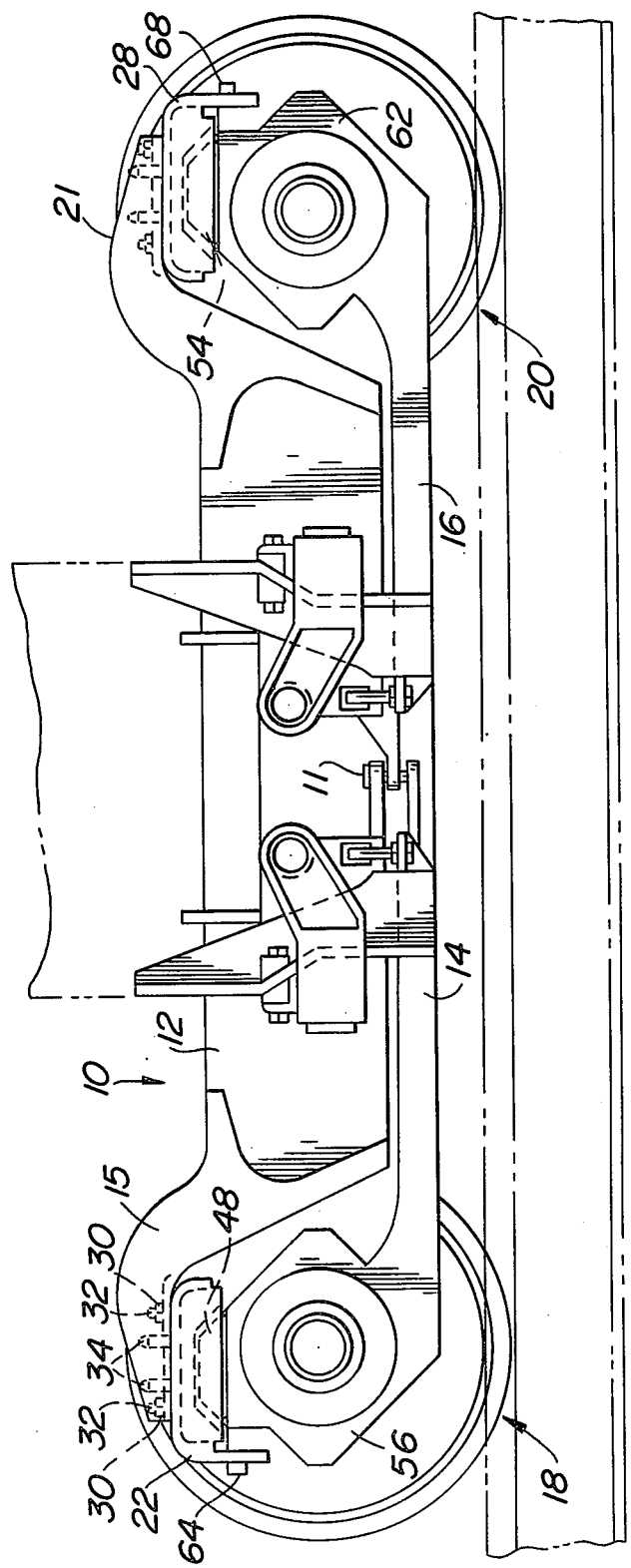
FIG. 1 is a side view of a portion of a railway truck illustrating one embodiment of the present invention.

The embodiment illustrated in FIGS. 1 and 2 relate to a steerable truck as described in connection with the aforementioned patent application. A railway truck 10 includes a pair of side frames 12 and 13. Only the side frame 12 is illustrated in FIG. 1 with only portions of the side frames 12 and 13 being illustrated in FIG. 2. The side frame 12 includes end members 15 and 21 and the side frame 13 includes end members 17 and 19. The various details of the truck and car body are not illustrated because the subject invention is directed toward the coupling assembly between two structural bodies which are adapted to be moved relative to each other when differential forces are applied thereto.

A pair of steerable arms 14 and 16, suitably connected together by pivot means 11, are adapted to receive thereon a pair of wheel axle assemblies 18 and 20. Coupling assemblies 22, 24, 26 and 28 are disposed to connect the end members 15, 17, 19 and 21, respectively, to receive corners of the bottom steerable arms 14 and 16. The end members form parts of the fixed side frames 12 and 13 which generally include a bolster for connecting the car body thereto (not illustrated).

The coupling assemblies 22, 24, 26 and 28 are fixedly mounted to the ends of the respective side frames 12 and 13 in the same manner. The coupling unit 22, for example, is fixed in place to the end member 15 of the side frame 12 by means of nuts 30 which are connected to threaded stems or bolts 32 which extend through the end member 15 of the side frame 12. A pair of locating pins 34 also extend from the coupling unit 22 and position it in the proper place on its side frames. The locating pins 34 permit the final assembly of the steerable arms 14 and 16 to be accurately mounted in the right places on the side frames 12 and 13 if the dimensions of the openings in the side frames vary slightly thereby permitting a higher degree of dimenstional tolerances.

Figure 2:
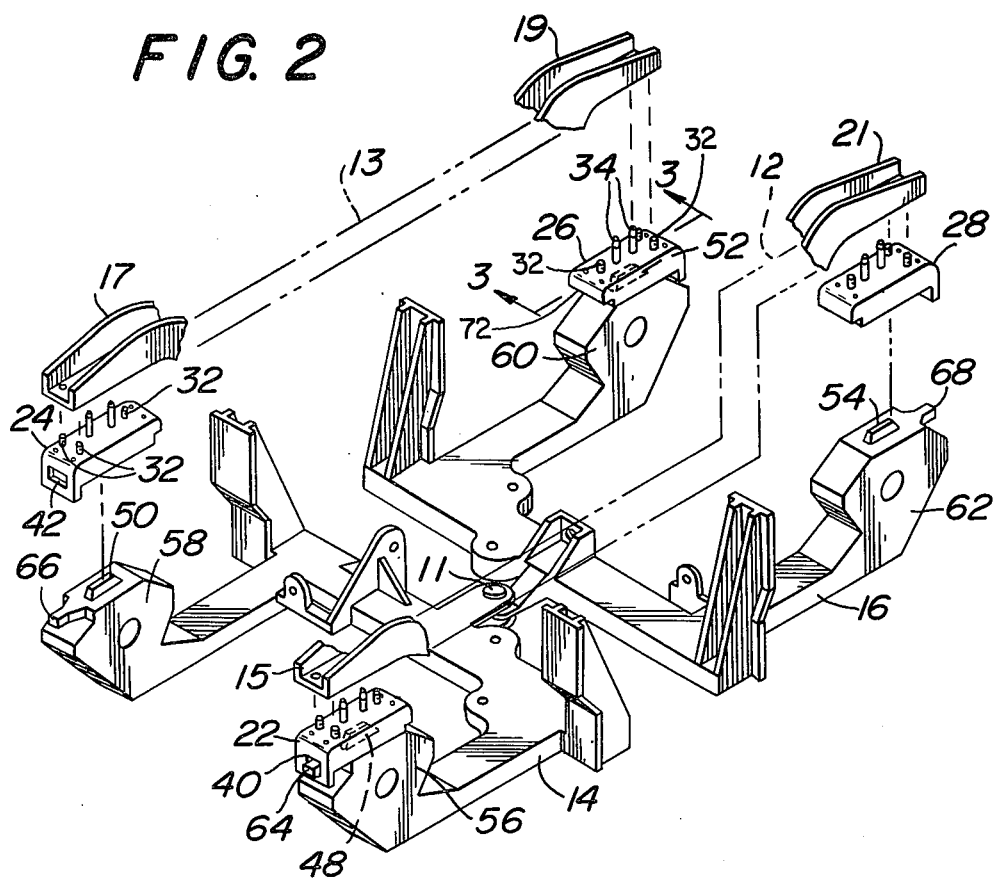
FIG. 2 is an exploded view illustrating the use of the present invention in a self steering truck, illustrated in FIG. 1.

The corners or ends of the coupling assemblies 22, 24, 26 and 28 include openings therein with only the openings 40 and 42 being illustrated in FIG. 2. These openings receive or mate with the projecting sections 64, 66 and 68 (one not being illustrated) which are connected to the ends of the steerable arms 14 and 16. The tops of the main sections 56, 58, 60 and 62 all include top projecting portions 48, 50, 52 and 54. The top projections 48, 50, 52 and 54 locate the steering arms 14 and 16 within openings of the coupling assemblies 22, 24, 26 and 28. After the coupling assemblies 22, 24, 26 and 28 are secured to the side frames 12 and 13, they are attached to the steerable arms 14 and 16 and held in place by the projections 64, 66, and 68. Additional means connect the central area of the steering arms to the bolster or car body (not illustrated).

All of the coupling assemblies are substantially similar and therefore only the assembly 26 will be described in detail, it being understood that all of the other assemblies operate in a similar manner. The steerable arms 14 and 16, described in the aforementioned application, are designed to maintain the wheel axle units 18 and 20 substantially radial with respect to the track when turns are being negotiated by the car. No further references will be made to the steerable aspect of the truck with the empahsis being given to the coupling unit which is designed to couple two structural bodies together while permitting some relative movement therebetween.

Figure 3:
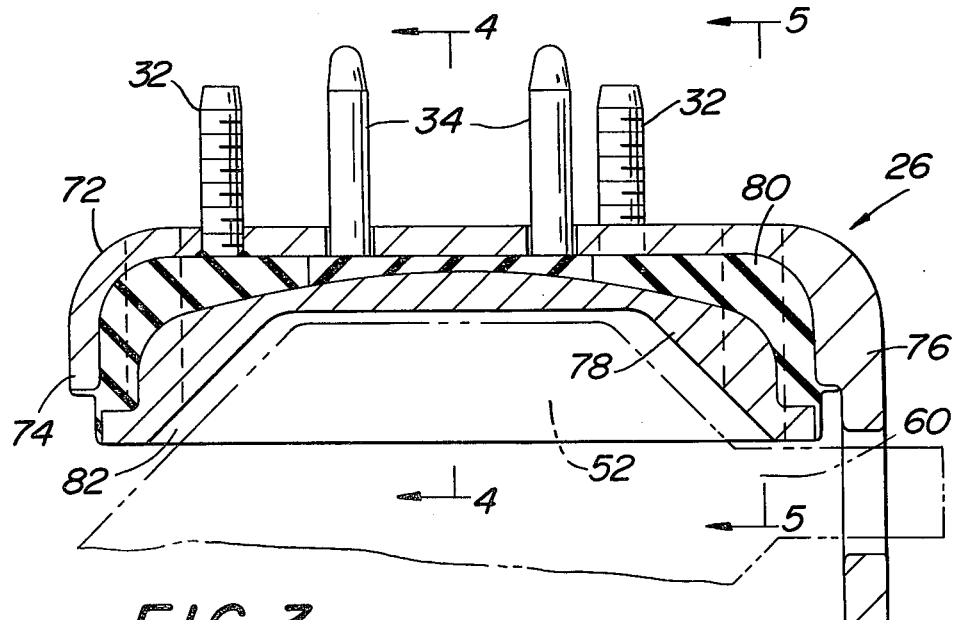
FIG. 3 is a cross-sectional view of the coupling assembly of the present invention taken along lines 3—3 of FIG. 2.
Figure 4:
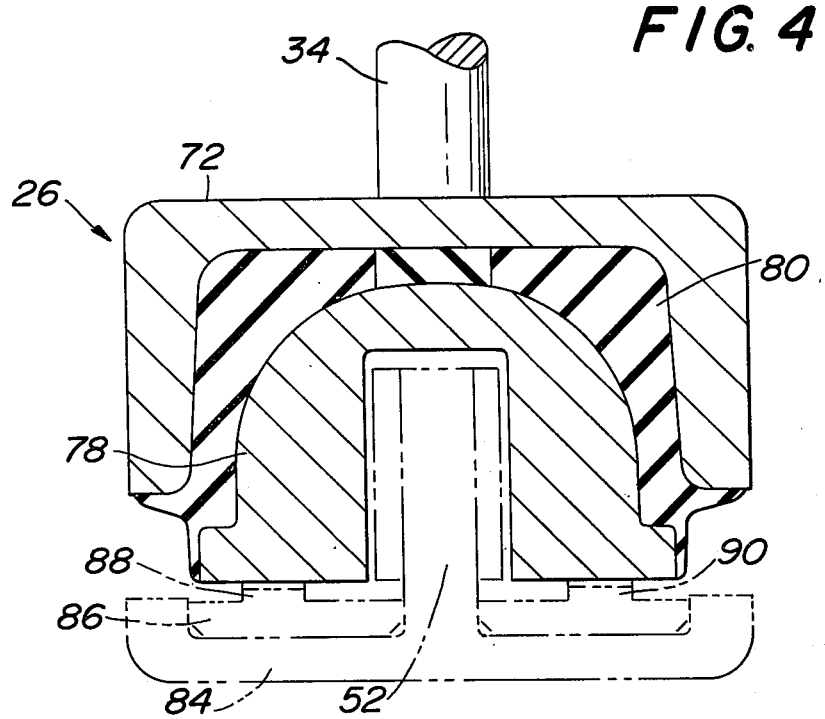
FIG. 4 is a cross-sectional view taken along lines 4—4 of FIG. 3.
Figure 5:
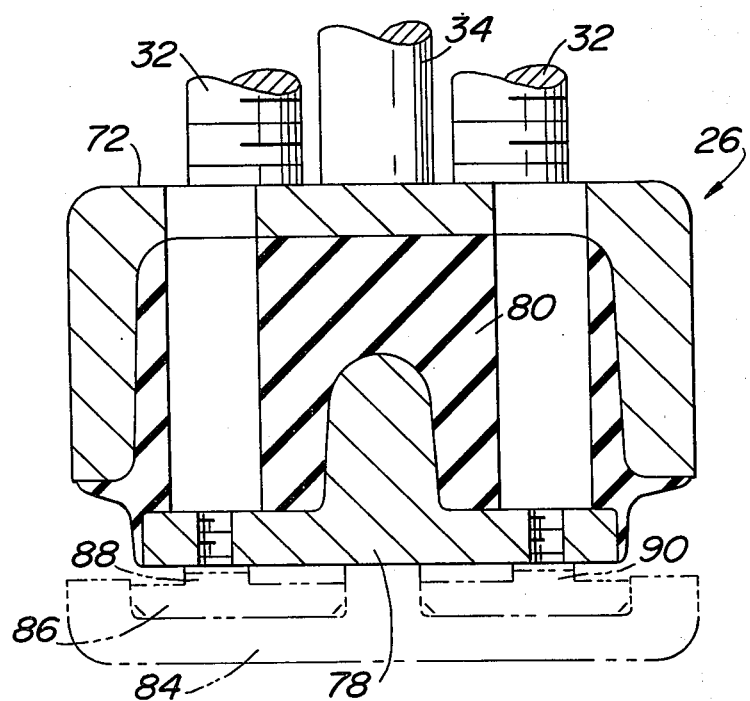
FIG. 5 is a cross-sectional view taken along lines 5—5 of FIG. 3.

Referring to FIGS. 3, 4 and 5, the coupling unit for assembly 26 comprises an outer metal plate or cap 72 which includes downwardly extending edges 74 and 76. A metal insert 78 is spaced from the top or outer cap 72 being somewhat smaller than the top plate or cap so as to fit therein. An elastomeric member 80 is bonded between the upper cap members 72 and the insert 78.

The metal insert 78 includes an opening 82 therein adapted to loosely receive the projecting portion 52 therein. There is sufficient space between the projecting portion 52 and the metal insert 78 to permit movement of the projecting portion 52 within the space. The space or opening 82 may be dimensioned to provide relatively free movement in one direction while providing restraints for other directions of movement.

During normal operation, the coupling assembly 26 is fixed to the end member 19 of the side frame 13 of the truck. The steerable arms 14 and 16 are adapted to be moved with respect to each other to provide radial steering. During normal operation, the coupling assembly including the coupling assembly 26 is loaded down by the weight of the car body. While the steerable arms are loosely fitted to the side frames of the truck, nevertheless, the weight of the car body will normally be enough to maintain the side frames 12 and 13 fixed with respect to the steerable arms when little differential forces are developed between the car body and truck.

As illustrated in FIGS. 4 and 5, an outer journal ring 84, normally associated with one end of the wheel axle unit 20, includes upwardly projecting sections to receive a base element 86 which is adapted to receive low friction elements 88 and 90 thereon. The metal insert 78 is in physical contact with the low friction elements 86 and 88 and is normally weighted thereon by the weight of the car body.

When the forces applied to the car body and coupling assemblies are different than the forces applied to the steerable arms 14 and 16, a differential force is developed which will tend to move one of the structural elements (e.g. side frame assembly and steerable arms) with respect to the other. In the embodiment illustrated, as when a turn is being negotiated on a track, longitudinal differential forces are developed between the coupling assembly 26 and the lower steerable arm 16. This causes the projecting element 52 to move longitudinally in the opening 82, which is shaped to permit longitudinal movement and restrict other types of movement in the embodiment illustrated. The relatively low friction permits the longitudinal movement to take place relatively easily without excessive forces being generated.

Prior to the movement of the projecting portions in the respective openings of the coupling assemblies, however, the elastomeric members, such as the member 80, provides a restraint for the movement and tends to deform up to a certain limit when relatively low differential forces are being developed between the side frames and steerable arms. During the deformation, the elastomeric members act as absorbers to prevent acceleration forces from being transmitted from the wheels of the car to the car body. The elastomeric members provide vertical, lateral and longitudinal springs. The arrangement of the elastomeric member 80 around its respective metal insert, such as the insert 78, provides a gimbaling effect to permit relatively small movement in all directions of the upper structural member, such as the side frames of the truck with respect to the lower structural members such as the steerable arms.

The openings with in the metal inserts permit the movements of the projecting sections therein up to a predetermined limit at which point the projecting section again comes into physical contact with the metal inserts to limit the movement of the upper and lower structural assemblies. In some cases, the elastomeric member may provide further restraints and some spring rate for very high applied forces.

The present invention has provided a system in which the elastomeric member provides a restraint for maintaining two separated bodies laterally, longitudinally and vertically. The elastomeric members serve as springs for absorbing the energy. At the same time, when the differential forces applied to the upper and lower structures exceed some predetermined limit, one of the structures will in effect slide with respect to the other without having to apply excessively high loads. At the same time, the arrangement of the projecting portions within the openings of the metal inserts limits the degree of movement within the system.

While the present invention has been explained primarily in terms of a steerable truck, the coupling assembly described may have a number of different applications where it is desired to couple one structure to a second structure while still permitting different types of relative movement therebetween depending upon the applied forces.

An example where the coupling unit of the present invention may be employed involves their use as lateral bumper stops found in conventional railway cars. In such conventional systems, the physical stops are employed to limit the lateral movement of the car body with respect to the truck under certain conditions. If the present invention is used, the freedom of movements may be achieved by providing very low friction elements with the final limit of the movement involved being determined by the sizes of the openings in one body which receive the projecting portions of the other body. Energy absorption and small limited movement for extremely high loads at the final position may be provided by the elastomeric member.

What is claimed is:

1. In combination with first and second vertically disposed structural bodies responsive to different applied forces to produce relative movement therebetween, a coupling assembly disposed between said first and second bodies comprising:

(a) means for fixedly mounting said coupling assembly to said first body;

(b) means for movably mounting said coupling assembly to said second body;

(c) relatively low friction means disposed between one of said bodies and said coupling assembly;

(d) said coupling assembly further comprising an elastomeric member to absorb energy and to permit limited movement between said first and second structural bodies when relatively low differential forces are applied thereto and to permit relatively free movement between said first and second structural bodies when relatively high differential forces are applied thereto;

(e) said coupling assembly further comprising an outer metal plate member and an inner metal insert member disposed within and spaced from said outer metal plate member with said elastomeric member being disposed therebetween; and (f) said outer metal including extending portions around said inner metallic insert member to restrict said elastomeric member therebetween.

2. A coupling assembly as set forth in claim 1 wherein said inner member includes a recess therein.

3. A coupling assembly as set forth in claim 2 wherein a protruding element extends from the structural body associated with said low friction means into the recess in said inner metal member to fit loosely therein to permit limited movement therein when relatively high differential forces are applied to said first and second structural bodies.

4. A coupling assembly as set forth in claim 3 wherein locating pins are connected to said upper plate member to permit said coupling assembly to be accurately located on the structural body.

5. A coupling assembly as set forth in claim 3 wherein the recess in said inner member is dimensioned to direct said protruding element to be moved in one direction while restricting movements in other directions.

6. A coupling assembly as set forth in claim 5 wherein attachment means are connected to said upper plate member to permit attachment of said coupling assembly to the structural body.

7. A coupling assembly as set forth in claim 6 wherein one of said structural bodies comprises a pair of steerable arms and the other of said structural bodies being side frames.

8. A coupling assembly as set forth in claim 7 wherein said recess is dimensioned to permit longitudinal movement between said first and second structural bodies while restricting lateral movement therebetween.

* * * * *